2,196,263

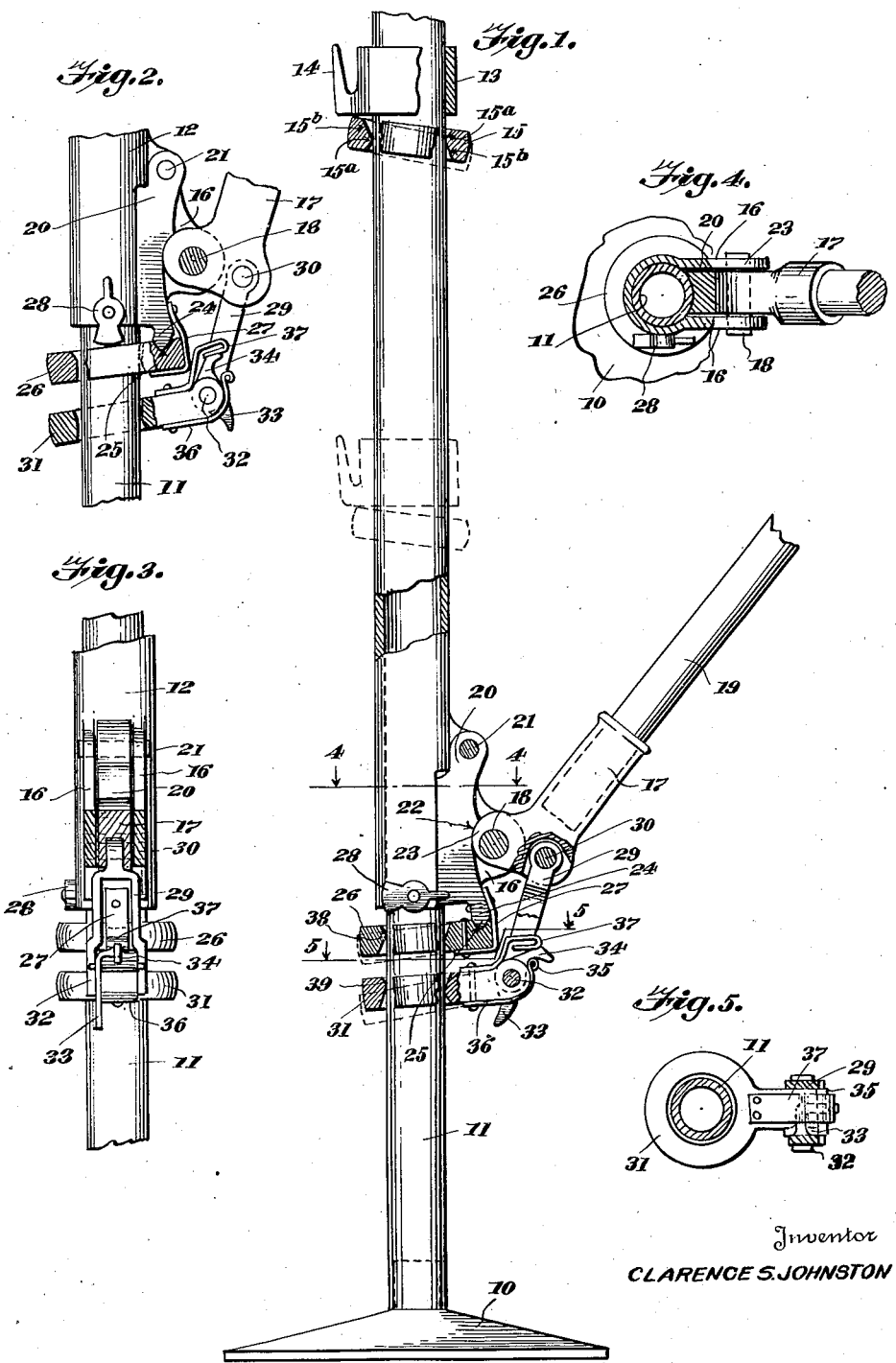
April 9, 1940.     C. S. JOHNSTON     2,196,263
FRICTION OPERATED BUMPER JACK
Filed Dec. 19, 1938
Inventor
CLARENCE S. JOHNSTON Patented Apr. 9, 1940

UNITED STATES PATENT OFFICE 2,196,263

FRICTION OPERATED BUMPER JACK

Clarence S. Johnston, Amarillo, Tex.

Application December 19, 1938, Serial No. 246,691

9 Claims. (Cl. 254—106)

This invention relates to jacks, and more specifically to an automobile bumper jack, and has for one of its objects the production of a simple and efficient means for elevating the jack through the manipulation of an actuating handle.

Another object of this invention is the production of a simple and efficient means for controlling the lowering of the jack, either slowly or rapidly, at the will of the operator.

Other objects and advantages of the present invention will appear throughout the following specification and claims.

In the drawing:

Figure 1 is a side elevational view of the jack, certain parts being shown in section and the gripping rings being shown in a gripping position;

Figure 2 is a fragmentary side elevational view, partly in section, showing the gripping rings in a released position;

Figure 3 is a front elevational view of a portion of the jack standard and sleeve;

Figure 4 is a horizontal sectional view taken on line 4—4 of Figure 1;

Figure 5 is a sectional view taken on line 5—5 of Figure 1.

By referring to the drawing, it will be seen that 10 designates the base which supports a vertical standard 11. A vertically slidable sleeve 12 is carried by the standard 11 and may be provided with a suitable lifting head, if desired, of the conventional type. A bumper-engaging sleeve 13 is slidably mounted upon the vertically slidable sleeve 12, and this bumper-engaging sleeve 13 carries a bumper engaging hook 14. An adjusting ring 15 is slidably mounted upon the sleeve 12 under the bumper-engaging sleeve 13, and is adjustable for locking the bumper engaging sleeve 13 in a desired position upon the sleeve 12. It should be understood that the sleeve 12 may be of any desired length for the purpose of lifting various articles. The ring 15 is provided with a cam rib 15a upon its inner face, which ring is adapted to grip the sleeve 12 when weight is placed on the hook 14. The ring 15 is provided with opposite receding inclined walls 15b upon the inner face of the ring and when the ring 15 is moved to the position shown in dotted lines in Figure 1, the ring 15 will be released and may be freely slidable on the sleeve 12. When weight is placed upon the ring 15 directly under the hook 14, the ring will be canted so as to cause the cam rib 15a to bite into and snugly grip the sleeve 12, but when the opposite side of the ring is forced downwardly to the position shown in dotted lines in Figure 1, this rib 15a will be disengaged from the sleeve 12 and the inclined receding walls 15b will be brought adjacent the sleeve 12, thereby enlarging the opening through the ring 15 and permitting the ring 15 to freely slide upon the sleeve 12.

The sleeve 12 is provided upon one side with a pair of spaced ears 16 between which ears is pivotally mounted a handle shank 17 by means of a supporting pin 18. A suitable handle 19 fits in the shank 17. A brake shoe 20 is pivotally secured, as at 21, between the ears 16 and this brake shoe 20 is provided with a curbed shoulder portion 22 which is adapted to be engaged by the eccentric end 23 of the handle shank 17. The brake shoe 20 is adapted to frictionally engage the standard 11, as shown in Figure 1, and as the shank 17 is swung upwardly the eccentric end 23 will engage the rounded shoulder 22 and force the brake shoe 20 which constitutes a friction brake in frictional engagement with the standard 11. As the shank 17 is swung downwardly, the eccentric end 23 will swing to a releasing position to allow the brake shoe 20 to swing slightly away from the standard 11. It will, therefore, be seen that the speed with which the sleeve 12 may descend, may be controlled easily by the pressure upon the handle 19 and the angle at which it is held.

The brake shoe 20 is provided with a depending knuckle 24 which is adapted to fit snugly within a substantially V-shaped pocket 25 formed in the upper face of the upper gripping ring 26, this socket 25 being located just below the knuckle 24 and the knuckle being tapered at its lower end to snugly fit in the V-shaped socket 25, as shown. This gripping ring 26 is of substantially the same structure as the ring 15, but in a reverse position, and a flat spring 27 connects the knuckle 24 of the shoe 20 with the ring 26 as shown in Figure 1. As the shoe 20 is forced inwardly against the standard 11, the tapering end of the knuckle 24 will ride upon the inclined face of the V-shaped socket 25 and cant the ring 26 to the position shown in full lines in Figure 2 and to the position shown in dotted lines in Figure 1. When pressure is released from the shoe 20, the spring 27 will cause the shoe 20 to be pulled outwardly away from the standard 11, bringing the ring 26 to the position shown in full lines in Figure 1 or to its locking position. The dotted position shown in Figure 1 and the full line position shown in Figure 2 represent the released position of the ring 26. The ring 26 may be manually moved to a released position by means of the pivoted button 28 which may be swung from the position shown in Figure 1 to the position shown in Figure 2 when it is desired to move the sleeve 12 freely upon the standard 11.

A link 29 is pivotally secured, as at 30, to the shank 17, and this link 29 pivotally engages a lower gripping ring 31 by means of a pivot pin 32. A trigger 33 is also pivotally mounted upon the pin 32, and this trigger 33 is provided with an arm 34 which normally overhangs the rolled end 35 of a spring 36 which is secured to the under face of the ring 31, and supports the arm 34 in the position shown in Figure 1. A flat pressure spring 37 is carried by the upper face of the ring 31, and this spring 37 is provided with a folded end normally overhanging the arm 34 to firmly hold the arm 34 in contact with the rolled end 35 of the spring 36. These two springs 36 and 37 hold the trigger 33 by engaging the arm 34 in a set position and lock the link 29 and the ring 31 together so that they may move in unison and prevent the ring 31 from pivotal movement upon the pin 32 and swinging movement with respect to the link 29. When the handle 19 is moved downwardly, the ring 31 which is constructed similarly to the ring 26, will firmly grip the standard 11 when in a position as shown in full lines in Figure 1, but as the handle 19 is moved upwardly, the ring 31 will assume the dotted line position shown in Figure 1, thereby providing a step-by-step lifting action for the sleeve 12, as the handle 19 is alternately moved upwardly and downwardly with a pumping action. When it is desired to allow the ring 31 to freely slide, such for instance as when moving the sleeve 12 to an approximately adjusted position, the trigger 33 may be swung to the position shown in Figure 2, lifting the spring 37 to the position shown in Figure 2 and allowing the ring 31 to freely swing with respect to the link 29.

It should be understood that the position of the trigger 33 in Figure 2 is the released position, whereby the ring 31 may freely swing with respect to the ring 37, and this trigger has been shown in this position simply for the purpose of illustration.

From considering the drawing, it should be noted that the rings 15, 26 and 31 are shown in their locking positions in full lines, and in their released positions by dotted lines. The rings 26 and 31 are provided with cam locking ribs 38 and 39 which are adapted to alternately firmly grip the standard 11 as the handle 19 is moved with a pumping action. The lower ring 31 will grip the standard as the upper ring 26 is released when the handle is moved downwardly and the upper ring 26 and shoe 20 will firmly grip the standard 11 as the handle 19 is moved upwardly, the ring 26 being automatically moved to and from a releasing position by the action of the shoe 20 through the medium of the knuckle 24 and socket 25 previously described. In this way, the sleeve 12 will be moved upwardly to an adjusted position in a step-by-step movement. The bumper-engaging sleeve 13 may be primarily adjusted to the desired position through the medium of the structure previously described.

Certain detail changes in the mechanical construction, and combination of parts may be employed without departing from the spirit of the invention, so long as such changes fall within the scope of the appended claims.

Having described the invention, what I claim is:

1. A jack of the class described comprising a standard, a sleeve slidable upon the standard, a friction brake shoe pivotally mounted upon the sleeve and frictionally engaging the standard, an operating handle pivotally mounted upon the sleeve and having means for moving the brake shoe into and out of frictional engagement with the standard, and elevating means engaging the standard and actuated by said handle.

2. A jack of the class described comprising a standard, a sleeve slidable upon the standard, a friction brake shoe pivotally mounted upon the sleeve and frictionally engaging the standard, an operating handle pivotally mounted upon the sleeve and having means for moving the brake shoe into and out of frictional engagement with the standard, elevating means engaging the standard and actuated by said handle, and a gripping ring actuated by the brake shoe and engaging said standard for holding the sleeve in an adjusted position.

3. A jack of the class described comprising a standard, a sleeve slidable upon the standard, a brake shoe carried by the sleeve, an operating handle pivotally mounted upon the sleeve and having means for moving the brake shoe into and out of frictional engagement with the standard, a gripping ring surrounding said standard, a link connecting said handle with the gripping ring, the link being adapted to move the gripping ring vertically of the standard, and a second gripping ring carried by the brake shoe and surrounding the standard for holding the sleeve in an adjusted position.

4. A jack of the class described comprising a standard, a sleeve slidable upon the standard, a friction brake shoe pivotally mounted upon the sleeve and frictionally engaging the standard, an operating handle pivotally mounted upon the sleeve and having means for moving the brake shoe into and out of frictional engagement with the standard, a gripping ring surrounding said standard, a link connecting said handle with the gripping ring, the link being adapted to move the gripping ring vertically of the standard, a second gripping ring carried by the brake shoe and surrounding the standard for holding the sleeve in an adjusted position, a spring carried by the first mentioned ring and engaging said link, said spring having a folded U-shaped portion, a trigger engaging the U-shaped portion, and a stop normally engaging the trigger, the spring and stop locking said first mentioned ring and link in set relation, the trigger being adapted to rotate and move the spring to an inoperative position whereby the first mentioned ring may be released and freely swung with respect to the link.

5. A jack of the class described comprising a standard, a sleeve slidable upon the standard, an operating handle pivotally mounted upon the sleeve and having means for moving the brake shoe into and out of frictional engagement with the standard, a gripping ring surrounding said standard, a link connecting said handle with the gripping ring, the link being adapted to move the gripping ring vertically of the standard, a second gripping ring carried by the brake shoe and surrounding the standard for holding the sleeve in an adjusted position, and a pivoted button for holding said second ring in an inoperative position.

6. A jack of the class described comprising a standard, a sleeve mounted upon the standard, a gripping ring hingedly suspended below the sleeve and surrounding the standard, spring means engaging the sleeve and ring for moving the ring to one position, friction gripping means carried by the sleeve, means carried by said sleeve for engaging the ring for moving the ring to a second position, an operating handle for actuating the friction means, a second gripping ring surrounding the standard, and a link connected to the handle and second gripping ring.

7. A jack of the class described comprising a standard, a sleeve slidably mounted upon the standard, a pair of spaced gripping rings engaging the standard, a handle pivotally mounted upon the sleeve, one ring being connected to the sleeve, the other ring being pivotally connected to the handle, and each ring having standard gripping ribs, and means for causing the rings to automatically grip and release the standard as the handle is alternately swung upwardly and downwardly.

8. A jack of the class described comprising a standard, adjustable means mounted upon said standard, friction means carried by said adjustable means and engaging the standard, means carried by the adjustable means for moving the friction means into and out of frictional engagement with the standard, and elevating means engaging the standard and actuated by said means for moving the friction means.

9. A jack of the class described comprising a standard, adjustable means mounted upon said standard, friction means carried by said adjustable means and engaging the standard, means carried by the adjustable means for moving the friction means into and out of friction engagement with the standard, elevating means engaging the standard and actuated by said means for moving the friction means, and bumper-engaging means carried by the adjustable means.

CLARENCE S. JOHNSTON.